United States Patent
Raphael

[15] 3,675,137
[45] July 4, 1972

[54] INSTANTANEOUS SINUSOIDAL ORTHOGONAL CONVERTER

[72] Inventor: Leon Raphael, 23816 Calvert St., Woodland Hills, Calif. 91364

[22] Filed: April 5, 1971
[21] Appl. No.: 131,208

[52] U.S. Cl. ............................ 328/144, 328/127, 328/133, 328/155
[51] Int. Cl. ............................................. G06g 7/20
[58] Field of Search ............... 328/155, 144, 160, 127, 133; 324/78 E

[56] References Cited

UNITED STATES PATENTS

| | | | |
|---|---|---|---|
| 3,123,769 | 3/1964 | Meyer | 324/78 E |
| 2,448,526 | 9/1948 | Gross | 328/127 X |

Primary Examiner—Donald D. Forrer
Assistant Examiner—B. P. Davis
Attorney—Nilsson, Robbins, Wills & Berliner

[57] ABSTRACT

A system for instantaneously providing a predetermined phase shift in a sinusoidal signal, the attenuation of which is substantially constant with changes in the frequency of the applied signal. First, phase displacement between two developed signals is accomplished by supplying an input signal both to: a differentiating network and an integrating network. Next, the phase displaced signals are multiplied to cancel the variations in attenuation providing a signal that is substantially invariable with frequency variations and is phase displaced from the initial input signal. As disclosed, a root circuit may provide a signal that is representative of the square root of the multiplied signal.

6 Claims, 3 Drawing Figures

INVENTOR.
LEON RAPHAEL
BY HIS ATTORNEYS
NILSSON, ROBBINS, WILLS & BERLINER

INSTANTANEOUS SINUSOIDAL ORTHOGONAL CONVERTER

BACKGROUND AND SUMMARY OF THE INVENTION

The need frequently arises for accomplishing a predetermined phase displacement in an applied electrical signal. Different forms of such systems are in widespread use in a variety of applications including: stabilizing networks, time-sequence systems and analog computer systems. Generally, the circuits for accomplishing phase displacement are classified either as phase-lag networks or phase-lead networks. A phase-lag network, which is often termed an integrator, accomplishes a lagging displacement in a developed signal. On the contrary, phase-leading networks, sometimes referred to as differentiators, accomplish a leading phase displacement.

Although both phase-lagging networks and phase-leading networks have been used in a variety of applications, prior-art forms of each type of circuits variously attenuate an applied sinusoidal waveform signal, with variations in frequency or do not operate in real time. That is, various static and dynamic forms of these circuits are well known to provide predetermined degrees of phase shift, but their transfer functions inherently produce output signals with an amplitude that varies with frequency, at least over certain ranges. Alternatively, phase shift networks attain the desired amplitude results; however, are not instantaneous in response. Accordingly, a considerable need exists for a system that may be embodied to accomplish a predetermined phase shift, e.g. 90°, in an applied sinusoidal signal, wherein the shifted signal is immediately responsive and is not varied in amplitude with frequency variations in the applied signal.

In general, the variations in attenuation (with changes of frequency) for differentiating and integrating networks are opposite. That is, the changes in attenuation as related to changes in frequency are opposite for integrating and differentiating networks. The present system accomplishes phase shift in an applied signal with an output that is substantially independent of frequency variations, by utilizing both a differentiating network and an integrating network to provide opposed-polarity phase-shifted signals which are multiplied to cancel the changes in attenuation with frequency variation. The components of the system enable real time operation, e.g. instantaneous response.

BRIEF DESCRIPTION OF THE DRAWINGS

In the drawings which constitute a part of this specification, an exemplary embodiment demonstrating various objectives and features hereof is set forth, as follows.

DESCRIPTION OF THE ILLUSTRATIVE EMBODIMENT

Figure 1:
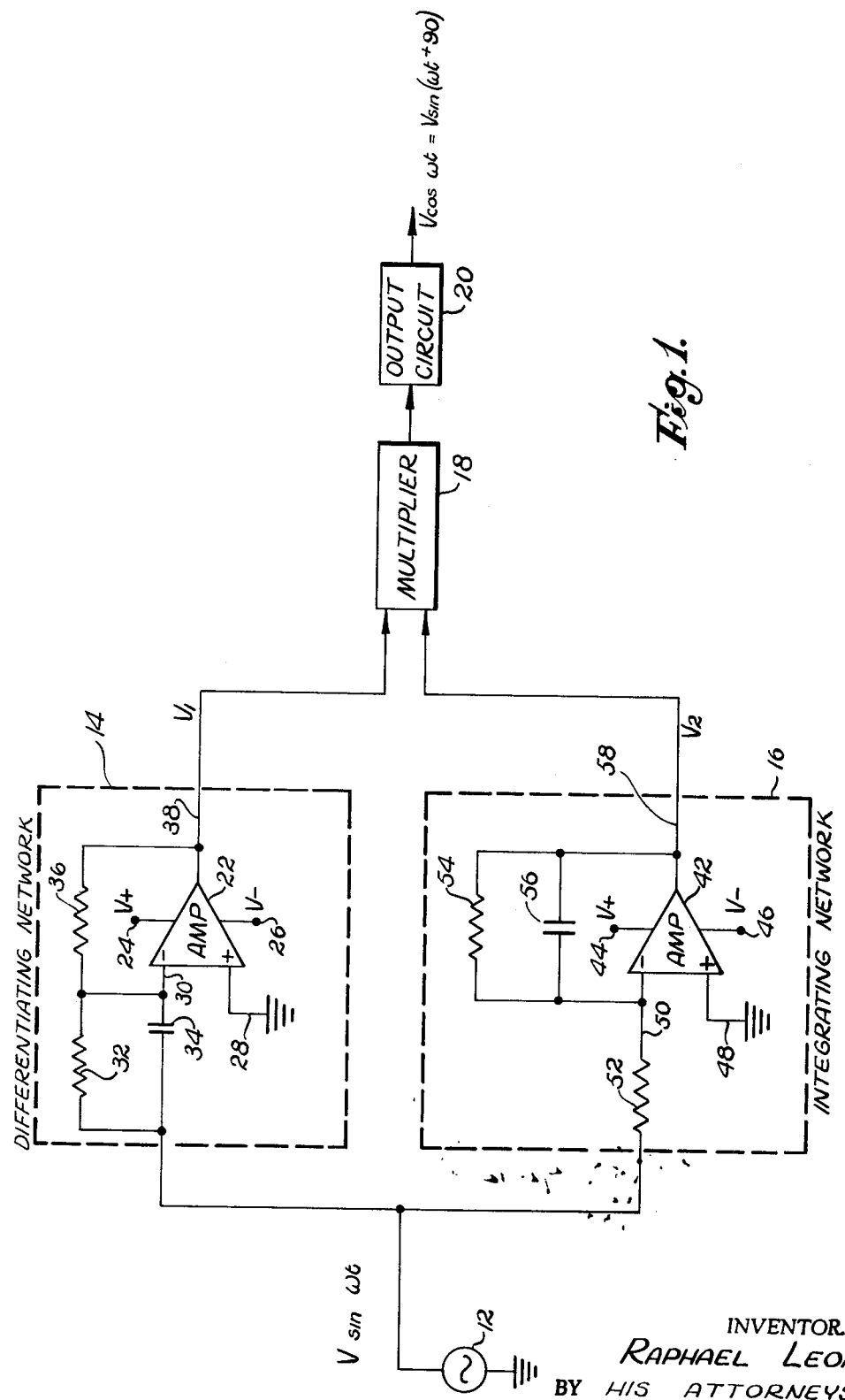
FIG. 1 is a schematic and block diagram of a system constructed in accordance with the present invention.

Referring initially to FIG. 1, there is shown a signal source 12 for providing a sinusoidal waveform $V \sin \omega t$. The waveform is applied to a differentiating network 14 and to an integrating network 16, to provide phase-displaced signals V1 and V2 respectively. The output signals from the networks 14 and 16 are applied to a multiplier 18 which is in turn connected to an output circuit 20. The details of those circuits are considered below; however, preliminarily, some analytical explanation of the system is deemed appropriate.

In general, integrating networks attenuate an applied sinusoidal signal increasingly with increases in frequency, while differentiating networks impart a decreasing attenuation with increases in frequency. As indicated above, the present system utilizes the opposed changes in attenuation by differentiating networks and integrating networks to accomplish a balanced phase-shift network in which amplitude is stable with variations in frequency.

Considering the present system in somewhat greater analytical detail, the output signal V1, from the differentiating network 14, may be identified as $-(\omega/\omega_1) V \cos \omega t$. Somewhat similarly, the output signal V2 from the integrating network is: $(\omega_2/\omega) V \cos \omega t$; where $\omega = 2\pi f$, $\omega_1 = (1/RC)_1$ and $\omega_2 = (1/RC)_2$. In the case of the integrating network, the value $\omega$ appears in the denominator of the fraction, while in the case of the differentiating network, the value appears in the numerator. Accordingly, it is apparent that by multiplying the fractions, the values of $\omega$ cancel. Furthermore, by providing the circuit parameters so that $\omega_1 = \omega_2$ the two expressions of $\omega$ are equal, so that multiplying the signals results in a product: $V^2 \cos^2 \omega t$, the other terms cancelling.

The multiplication to accomplish such a term is performed by the multiplier 18 as indicated in FIG. 1. The signal from the multiplier 18 may be employed directly in that form in certain applications, the signal being amplitude stable with reference to frequency. However, it may also be desirable to restore the signal to an initial amplitude level by providing a square root analog circuit as the output circuit 20. Specifically, extracting the square root of $V |V| \cos^2 \omega t$ provides the output signal $V \cos \omega t$ or $V \sin (\omega t + 90°)$. Thus, it may be seen that the desired orthogonal phase shift is accomplished, is independent of frequency variations and may be instantaneous.

Considering the structural aspects of the system of FIG. 1 in somewhat greater detail, the signal source 12 as related hereto, may take any of a variety of specific forms, as for example, simply a signal path providing the sinusoidal input $V \sin \omega t$. The differentiating network 14 and the integrating network 16 are indicated as dynamic circuits to provide the degree of phase shift that is substantially independent of frequency as well as to provide desired operating levels of signal amplitude.

The differentiating network 14 incorporates an operational amplifier 22 having linear characteristics as generally well known in the prior art. Positive and negative potentials are indicated at terminals 24 and 26 for the amplifier 22 in accordance with convention. A non-converting input line 28 to the amplifier 22 is connected to ground potential, while an inverting input 30 to the amplifier 22 receives the applied signal (from source 12) through a parallel connected resistor 32 and a capacitor 34. A feedback resistor 36 is connected between the input line 30 and an output line 38 from the amplifier 22. This configuration for a dynamic differentiating network is well known in the prior art and further detailed description is not deemed necessary or appropriate.

The integrating network 16 is also a well-known configuration and incorporates and operational amplifier 42 connected to receive positive and negative potential across terminals 44 and 46. A non-inverting input line 48 to the amplifier 42 is connected to ground potential while an inverting input line 50 is connected to be driven by the applied signal supplied through a resistor 52 from the source 12. The feedback (integrating) circuit of the amplifier 42 includes a resistor 54 and a capacitor 56 connected in parallel relationship between the input line 50 and an output conductor 58.

The output conductors 38 and 58 are connected to supply the signals V1 and V2 respectively to the multiplier 18. A variety of well-known multiplier circuits may be utilized as the multiplier 18; however, a specific form of multiplier is described hereinafter with reference to FIG. 2, which has proven effective in this application.

The output $(V1 \cdot V2 = V^2 \cos^2 \omega t)$ from the multiplier 18 may, in some applications of the system, simply be supplied through an output circuit for direct use by another component. However, as indicated above, the situation frequently arises wherein it is desirable to return the phase-displaced signal to an amplitude which is closely related to the applied input signal. This relationship is accomplished by developing a signal that is representative of the square root of the signal supplied from the multiplier 18. A form of root-extracting circuit for use as the output circuit 20 is disclosed in detail below.

Although the system hereof may find application to accomplish various degrees of phase shift, certain specific advantages are inherent in the accomplishment of a ninety degree phase shift. One exemplary application for such a network involves mixing the 90°, phase shifted signal with the initially applied signal to provide a direct-current analog that is representative of the sinusoidal amplitude. That is, by imparting a 90° phase shift to a sinusoidal signal of varying amplitude and/or frequency, then additively combining such a signal with the original signal, an effective sinusoidal-to-analog conversion is accomplished. The system hereof will additionally generate other specific applications and in that regard affords an effective component for many system configurations known, and yet to be developed.

Figure 2:
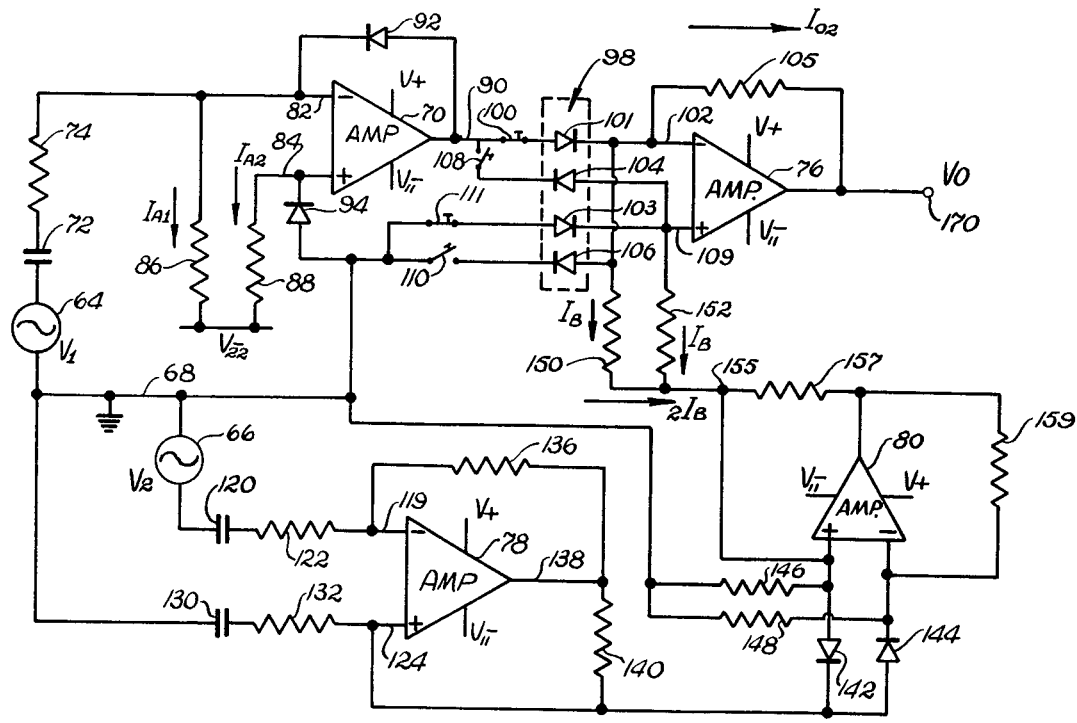
FIG. 2 is a more-detailed schematic and block diagram of a portion of the system of FIG. 1.

Reference will now be made to FIG. 2 which shows a suitable form for the multiplier 18 (FIG. 1). Two input signals indicated as $V1$ and $V2$ are illustrated to be provided from sources 64 and 66, each source having one side grounded through a bus 68. The signal source 64 drives an amplifier 70 through a serially connected capacitor 72 and resistor 74. The amplifier 70 along with each of the other amplifiers disclosed in the system of FIG. 2 are linear, operational amplifiers as well known in the prior art, and as previously described herein.

The essential multiplier operation is provided by the amplifier 70 along with an amplifier 76 (upper right). An amplifier 78 (lower central) is driven by the signal source 66 and functions to convert the representative input signal voltage to an equivalent bilateral current source which becomes one of the parameters of the multiplication. The current provided from the amplifier 78 is rectified by an amplifier 80 (lower right) to provide a control signal for the amplifier 76 whereby operation thereof is essentially as a variable gain amplifier.

The system of FIG. 2 basically incorporates logarithmic amplifier techniques to provide an effective multiplier for use in the system as disclosed with reference to FIG. 1, and having independent application as well. Considering the multiplier in somewhat greater structural detail, the inputs 82 and 84 to the amplifier 70 are connected to a negative bias potential through resistors 86 and 88. The input 82 also receives a feedback signal from the amplifier output 90, through a diode 92. The amplifier input 84 is coupled through a diode 94 to ground thereby affording a reference level potential in relation to diode 92.

The input circuit to the amplifier 76 from the amplifier 70 is provided through alternate pairs of a set 98 of diodes. Essentially, the diodes in the set 98 provide symmetry and enable the selection of a desired output waveform polarity (in relation to that of the input signal). Specifically, the output line 90 is connected through a switch 100 and a forward diode 101 to one input 102 of the amplifier 76. The output 90 is also connected through a switch 108 and a reverse diode 104 to the other input 109 of the amplifier 76. Ground potential, i.e. bus 68, is connected through a switch 111 and a forward diode 103 to the input 109 of the amplifier 76. Ground potential is also connected through a switch 110 and a reverse diode 106 to the input 102 of the amplifier 76. A feedback path is provided through a resistor 105. By appropriate configurations of the switches 100, 108, 110 and 111, various output waveform polarities may be accomplished in relation to the input signal. It is also noteworthy that in one operating configuration, in which all the diodes in the set 98 are operative, the amplifier 80 and related components are eliminated.

The second signal V2, representing a value for the multiplication (as indicated to be provided from the signal source 66) is supplied to an input 119 of the amplifier 78 through a serially connected capacitor 120 and resistor 122. The other input 124 of the amplifier 78 is connected to ground potential through a serially connected capacitor 130 and resistor 132. A feedback resistor 136 is provided between the output 138 of the amplifier 78 and the input 119. The output is also referenced back to the input 124 through a resistor 140 and is applied through a similar path to the amplifier 80. Essentially, diodes 142, 144 and the amplifier 80 function to accomplish full wave rectification. The amplifier 80, in conjunction with the resistors 146, 148, 157 and 159, provides an output in the form of a current drawn through resistors 150 and 152 which serves to control the gain in the amplifier 76. The resistors 150 and 152 are joined at a junction point 155 which is connected to the output of the amplifier 80 through the resistor 157 and directly to the input resistor 146. A feedback through resistor 159 is provided.

As indicated above, in the operation of the system, the amplifier 78 provides a current source which is equivalent to the signal from the source 66 and which current source is rectified by the amplifier 80 and its related circuit to vary the gain of the amplifier 76 and thereby provide a product output at a terminal 170. This form of multiplier has been found to function effectively in the system as represented in FIG. 1 and provides flexibility in adapting to alternate system requirements. Of course, various changes and additions may occur in the basic multiplier structure as disclosed. For example, in unidirectional output current applications the resistor 105 may be replaced by an active element, as a field effect transistor. With such a substitution, the output voltage $V_0$ is diminished by an amount coinciding to the voltage appearing in the input terminal 109.

The transfer function of the multiplier circuit, as shown in FIG. 2, operating essentially as a variable gain unit will now be considered, providing: all the diodes and resistors are matched; $A_M$ is the multiplier transfer function; and V1 and V2 are input signal voltages and $V_0'$ is the output signal voltage as referred to input 102. The current 2IB is generated by the amplifiers 78 and 80 as follows: when amplifier 80 provides a current gain = 1, $$2IB = |V2| \frac{R_{136}}{R_{122} + \frac{1}{SC_{120}}} \cdot \frac{1}{R_{140}}$$

$$= \frac{|V2|}{R_{122} + \frac{1}{SC_{120}}} \cdot \frac{R_{136}}{R_{140}}$$

when $R_{136} = R_{140}$, $$2IB = \frac{|V2|}{R_{122} + \frac{1}{SC_{120}}} \text{ and } IB = \frac{|V2|}{2\left(R_{122} + \frac{1}{SC_{120}}\right)}$$

then:

$$\frac{V_0'}{V_1} = A_M = \frac{R_{105}}{R_{74} + \frac{1}{SC_{72}}} \cdot \frac{|V2|}{2\left(R_{122} + \frac{1}{SC_{120}}\right)} \cdot \frac{1}{I_1}$$

and $$V_0' = \frac{R_{105}}{2\left(R_{74} + \frac{1}{SC_{72}}\right)\left(R_{122} + \frac{1}{SC_{120}}\right)} \cdot V1 \cdot \frac{|V2|}{I_1}$$

when $$V_2 = \frac{\omega_2}{\omega} V \cos \omega t$$

$$V_1 = \frac{-\omega}{\omega_1} V \cos \omega t, \text{ if } \omega_1 = \omega_2 \text{ then:}$$

$$V1 \cdot |V2| = - V|V| \cos^2 \omega t$$

further, $$V_0' = \frac{- R_{105} \cdot V|V| \cos^2 \omega t}{2\left(R_{74} + \frac{1}{SC_{72}}\right)\left(R_{122} + \frac{1}{SC_{120}}\right) I_1}$$

as: $R_{105}$; $R_{74} + \frac{1}{SC_{72}}$; $R_{122} + \frac{1}{SC_{120}}$; and $I_1$ are fixed, let $$\frac{K}{V_1} = \frac{R_{105}}{2\left(R_{74} + \frac{1}{SC_{72}}\right)} \cdot \frac{1}{\left(R_{122} + \frac{1}{SC_{120}}\right)} \cdot \frac{1}{I_1}$$

consequently, $$V_0' = \frac{-K}{V_1} \cdot V|V| \cos^2 \omega t$$

Figure 3:
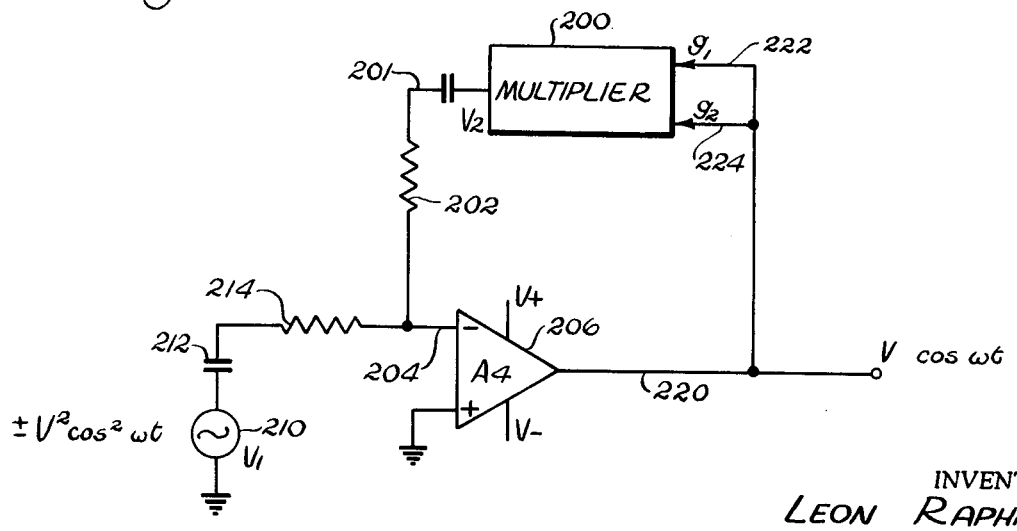
FIG. 3 is a more-detailed schematic and block diagram of still another portion of the system of FIG. 1.

Reference will now be made to FIG. 3 which shows an exemplary detailed form of the output circuit 20 (FIG. 1). As indicated above, the output circuit 20 may take a variety of forms including a circuit for providing a signal representative of the square root of a received signal. A form of such a circuit is shown in FIG. 3 and serves in the system of FIG. 1 to provide a signal of amplitude that is substantially identical to the original applied signal with the exception of phase angle.

The root circuit, as represented in FIG. 3 utilizes a multiplier 200 which may take the form of the amplifier circuit as indicated in FIG. 2. In various applications, it is desirable to afford a balance between these circuits and accordingly similar units should be employed. That is, when the multiplier 200 in the root circuit of FIG. 3 is identical to the multiplier 18 of FIG. 1, the output is independent of network parameters, so that $V_{out} = V \cos \omega t$.

Essentially, the operation of the root circuit of FIG. 3 is to produce a square product of the output signal by means of the multiplier 200 and supply that signal through a capacitor 201 and a resistor 202 to an input 204 of an amplifier 206. A wide variety of specific input arrangements and circuit structures can be employed.

The amplifier 206 is connected to receive the signal from which a root is to be extracted, as indicated for example, from a signal source 210. From the source 210 the signal is applied through a capacitor 212 and a serially connected resistor 214 to the input conductor 204. The output from the amplifier 206 is supplied to a conductor 220 which supplies the two inputs 222 and 224 for the amplifier 200. Accordingly, a feedback reduction of the input signal reduces that signal to a value representative of the square root of the applied input signal as desired.

Although specific forms of the system herein have been described in detail, as indicated above, the system may utilize component circuits substantially different from those disclosed in detail herein. Accordingly, the scope hereof is to be determined in accordance with the claims as follows.

What is claimed is:

1. A phase shift system for providing a predetermined phase shift is an applied signal, substantially independent of frequency, and substantially instantaneously, comprising:

phase shift means, including a differentiating phase shift circuit and an integrating phase shift circuit having opposed attenuation characteristics as related to frequency, said phase shift means being connected to receive said applied signal for providing first and second signals derived from said applied signal and each having been phase displaced with opposite polarity by substantially said predetermined phase shift;

multiplier means for combining said first and second signals to provide a product signal representative of the product of the values of said first and second signals; and output circuit means connected to provide said product signal from said multiplier means.

2. A phase shift system for providing a predetermined phase shift according to claim 1 wherein said predetermined phase shift is 90°.

3. A phase shift system according to claim 1 wherein said output circuit comprises a root circuit for providing a root signal representative of the square root of said product signal.

4. A phase shift system according to claim 1 wherein said phase shift means includes a first operational amplifier and an interconnected integrating phase shift circuit and a second operational amplifier and an interconnected differentiating phase shift circuit.

5. A phase shift system according to claim 1 wherein said multiplier means comprises:
   a first amplifier connected to receive said first signal;
   a second amplifier connected to receive said second signal to function as a current source;
   at least one pair of diodes;
   a full-wave rectifier;
   a third amplifier;
   means for connecting said first amplifier through said diodes to provide one input to said third amplifier; and
   means for connecting said second amplifier through said full-wave rectifier to provide another input to said third amplifier.

6. A multiplier circuit for providing an output signal representative of the product of first and second input signals comprising:
   a first amplifier connected to receive said first signal;
   second amplifier connected to receive said second signal to function as a current source;
   at least one pair of diodes;
   a full-wave rectifier;
   a third amplifier;
   means for connecting said first amplifier through said diodes to provide one input to said third amplifier; and
   means for connecting said second amplifier through said full-wave rectifier to provide another input to said third amplifier.

* * * * *